(12) United States Patent
Maas

(10) Patent No.: US 8,165,074 B2
(45) Date of Patent: Apr. 24, 2012

(54) TECHNIQUES FOR HANDLING SERVICE FLOWS IN WIRELESS COMMUNICATION SYSTEMS

(75) Inventor: David R. Maas, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1021 days.

(21) Appl. No.: 11/949,092

(22) Filed: Dec. 3, 2007

(65) Prior Publication Data

US 2009/0141677 A1  Jun. 4, 2009

(51) Int. Cl.
*H04Q 7/00* (2006.01)
*H04J 3/16* (2006.01)

(52) U.S. Cl. ........................ 370/329; 370/468
(58) Field of Classification Search ................ None
See application file for complete search history.

(56) References Cited

U.S. PATENT DOCUMENTS

| | | | |
|---|---|---|---|
| 2003/0012147 A1* | 1/2003 | Buckman et al. | 370/260 |
| 2004/0109459 A1 | 6/2004 | Madour et al. | |
| 2006/0028982 A1 | 2/2006 | Wright | |
| 2006/0075093 A1 | 4/2006 | Frattura et al. | |
| 2006/0111111 A1* | 5/2006 | Ovadia | 455/439 |
| 2006/0227747 A1* | 10/2006 | Kim et al. | 370/331 |
| 2007/0153801 A1 | 7/2007 | Sung et al. | |
| 2007/0223491 A1* | 9/2007 | Baek et al. | 370/395.21 |
| 2008/0123543 A1* | 5/2008 | Do et al. | 370/252 |
| 2008/0130531 A1* | 6/2008 | Chou | 370/310 |
| 2008/0232254 A1* | 9/2008 | Chhaya et al. | 370/236 |
| 2008/0267085 A1* | 10/2008 | Bae et al. | 370/252 |
| 2008/0304445 A1* | 12/2008 | Chou | 370/329 |

FOREIGN PATENT DOCUMENTS

| | | |
|---|---|---|
| KR | 100699531 B1 | 3/2007 |
| WO | 0101272 A2 | 1/2001 |

OTHER PUBLICATIONS

IEEE Std 802.16e-2005 and IEEE Std 802.16-2004/Cor 1-2005, "Part 16: Air Interface for Fixed and Mobile Broadband Wireless Access Systems Amendment 2: Physical and Medium Access Control Layers for Combined Fixed and Mobile Operations in Licensed Bands and Corrigendum 1", Feb. 28, 2006, Sections 6 and 11; Figure 95.

Kim, Byoung Sun: The International Search Report and Written Opinion of the International Searching Authority, or the Declaration, Korean Intellectual Property Office Daejeon Republic of Korea, completed Jun. 17, 2009, mailed Jun. 17, 2009.

* cited by examiner

*Primary Examiner* — Hassan Phillips
*Assistant Examiner* — Eunsook Choi

(57) ABSTRACT

A technique for handling service flows in a wireless communication system includes receiving a first packet over a first service flow. In this case, the first service flow has a first quality of service. Next, a packet classifier associated with the first packet is determined. A second service flow with a selected quality of service is then created when the packet classifier for the first packet corresponds to a selected classifier.

16 Claims, 3 Drawing Sheets

TECHNIQUES FOR HANDLING SERVICE FLOWS IN WIRELESS COMMUNICATION SYSTEMS

BACKGROUND

1. Field

This disclosure relates generally to wireless communication systems and, more specifically, to techniques for handling service flows in wireless communication systems

2. Related Art

Today, many wireless communication systems are designed using a shared uplink (UL) channel. For example, in the Institute of Electrical and Electronics Engineers (IEEE) 802.16 (commonly known as worldwide interoperability for microwave access (WiMAX)) and third-generation partnership project long-term evolution (3GPP-LTE) compliant architectures, a UL channel is shared and resources may be periodically allocated to individual service flows in the case of delay sensitive (e.g., real-time) applications (e.g., voice over Internet protocol (VoIP) applications). In a WiMAX compliant architecture, dynamic service flows for VoIP packets may be initiated by a subscriber station (SS), e.g., a mobile station (MS). However, known MSs have not generally been capable of initiating dynamic service flows for other types of traffic besides VoIP traffic.

In WiMAX compliant wireless communication systems, a quality of service (QoS) parameter set is defined for each service flow, which is a unidirectional flow of packets between an SS and a serving BS and vice versa. Each service flow has an assigned service flow identification (SFID), which functions as a principal identifier for the service flow between an SS and a serving BS. In WiMAX compliant wireless communication systems, scheduling services represent the data handling mechanisms supported by a medium access control (MAC) scheduler for data transport on a connection. Each connection is associated with a single scheduling service, which is determined by a set of QoS parameters that are managed using, for example, dynamic service addition (DSA) and dynamic service change (DSC) message dialogs. IEEE 802.16e compliant wireless communication systems support a number of different data services. For example, IEEE 802.16e compliant wireless communication systems are designed to support unsolicited grant service (UGS), real-time polling service (rtPS), extended real-time polling service (ertPS), non-real-time polling service (nrtPS), and best effort (BE) service.

UGS is designed to support real-time uplink service flows that transport fixed-sized packets on a periodic basis, such as T1/E1 and voice over Internet protocol (VoIP) without silence suppression. In general, UGS offers fixed-sized grants on a real-time periodic basis, which generally eliminates overhead and latency associated with SS requests and generally assures that grants are available to meet real-time requirements of a flow. The rtPS is designed to support real-time uplink service flows that transport variable size data packets on a periodic basis, e.g., moving picture expert group (MPEG) video. The rtPS offers real-time, periodic, unicast request opportunities that are designed to meet real-time requirements of a service flow while allowing an SS to specify a desired grant size. The ertPS is a scheduling mechanism that builds on the efficiency of both UGS and rtPS. Similar to UGS, in ertPS a BS provides unicast grants in an unsolicited manner, which saves the latency associated with a bandwidth request. However, while UGS allocations are fixed in size, ertPS allocations are dynamically sized. The ertPS is designed to support real-time service flows that generate variable size packets on a periodic basis, such as VoIP services with silence suppression. The nrtPS offers unicast polls on a regular basis, which generally assures that an uplink service flow receives request opportunities, even during network congestion. Finally, the BE grant scheduling type is designed to provide efficient service for best effort traffic in an uplink. As noted above, with the exception of VoIP traffic, in WiMAX compliant wireless communication systems all traffic is assigned a BE QoS, as MSs (as currently designed) are not capable of initiating dynamic service flows for other types of traffic.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
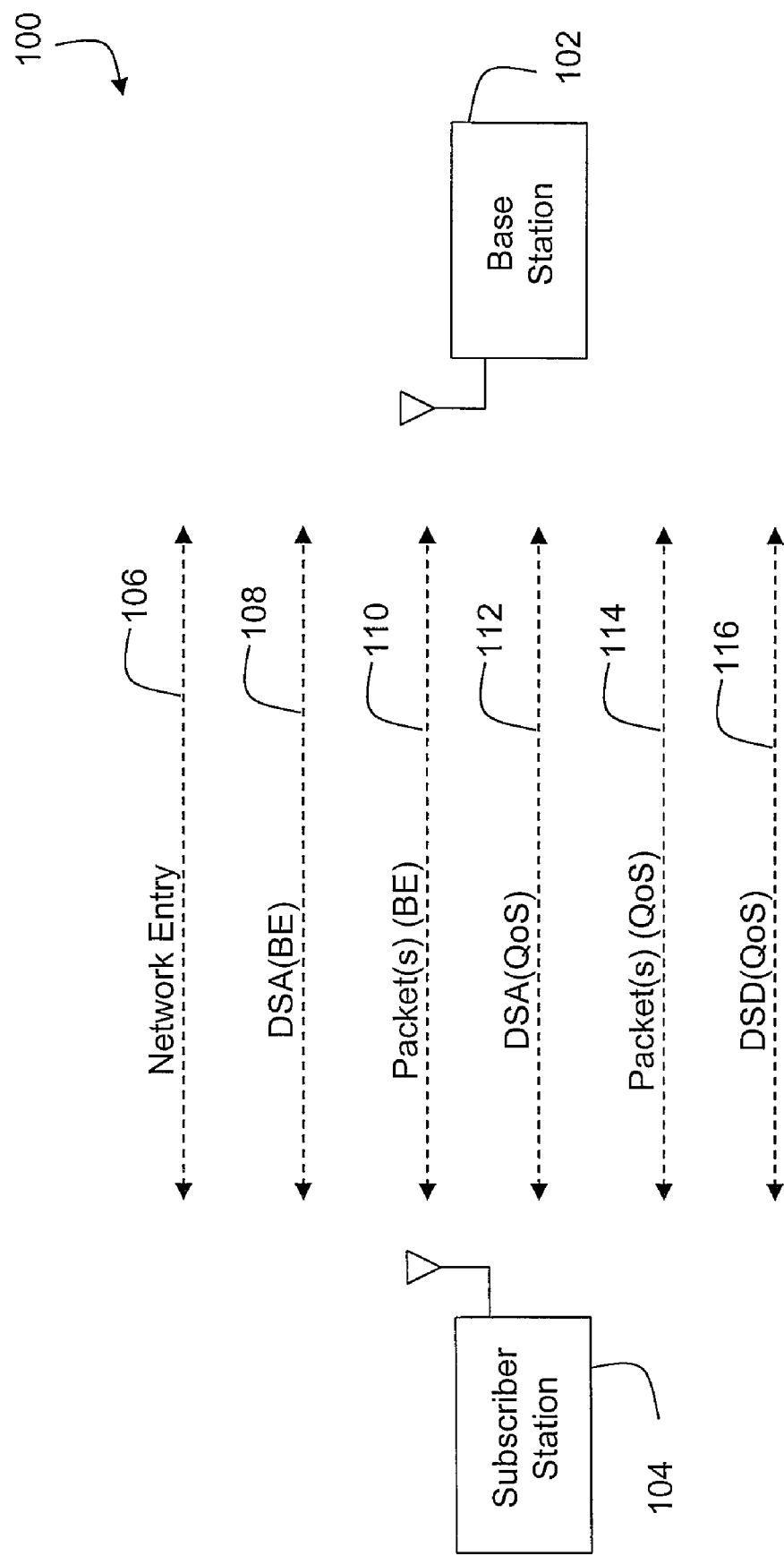
FIG. 1 is a service flow diagram that illustrates the creation and deletion of a dynamic service flow based on a packet classifier, according to the present disclosure.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents.

While the discussion herein is generally directed to a WiMAX compliant wireless communication system, it should be appreciated that the techniques disclosed herein are broadly applicable to wireless communication systems that employ quality of service (QoS) classes that utilize periodic resource allocations. As used herein, the term "coupled" includes both a direct electrical connection between blocks or components and an indirect electrical connection between blocks or components achieved using intervening blocks or components. As is also used herein, the term "subscriber station" and "user equipment" are synonymous and are utilized to broadly denote a wireless communication device.

In general, in customer premises equipment (CPE), packets are not routed through a control processor and, as such, cannot be snooped. The exception is analog telephone adapter (ATA) or VoIP traffic, which includes visible voice packets which, when detected by a mobile station (MS), cause the MS to initiate a dynamic service flow for the VoIP traffic. In general, at a serving base station or access point, traffic is routed through a control processor that may be configured to snoop the traffic. According to various aspects of the present disclosure, a dynamic service flow is added by an access point (AP), also referred to herein as a base station (BS), in response to receiving a packet having a selected packet classifier. The selected packet classifier provides a way to map packets to a dynamic service flow having a desired quality of service (QoS). In at least one embodiment, initially, no resources are reserved for the dynamic service flow (i.e., the dynamic service flow starts off in an internal provisioned state). When the AP detects a packet whose classifier matches a selected packet classifier, the AP moves the dynamic service flow from an inactive state to an active state and sends a dynamic service addition (DSA) message to an appropriate SS to notify the SS of the dynamic service flow. In this manner, packets for an application are carried on a service flow with an appropriate QoS (as contrasted with a default best effort (BE) QoS). In at least one embodiment, when the AP detects a requisite amount of inactivity (which may be based on no activity for a selected time period, i.e., expiration of a timer) on the dynamic service flow, the dynamic service flow is deleted (e.g., by sending a dynamic service deletion (DSD) message from the AP to the SS). It should be appreciated that the classifier may use any classification fields allowed by an implemented wireless communication system. For example, most applications (e.g., game applications) use a known port number which can be detected and compared to one or more packet classifiers to determine whether a new dynamic service flow is required. As another example, a server Internet protocol (IP) address may be detected to determine whether a new dynamic service flow is required.

According to one aspect of the present disclosure, a technique for handling service flows in a wireless communication system includes receiving a first packet over a first service flow. In this case, the first service flow has a first quality of service (QoS), e.g., a BE QoS. Next, a packet classifier (which may be based on, for example, a port number or on server IP address) associated with the first packet is determined. A second service flow with a selected QoS (e.g., an ertPS QoS) is then created when the packet classifier for the first packet corresponds to a selected classifier.

According to another aspect of the present disclosure, a base station (BS) includes a receiver and a processor coupled to the receiver. The receiver is configured to receive (e.g., from a subscriber station (SS)) a first packet over a first service flow. In this case, the first service flow has a default QoS. The processor is configured to determine a packet classifier associated with the first packet. The processor is also configured to create a second service flow with a selected QoS when the packet classifier for the first packet corresponds to a selected classifier.

According to a different aspect of the present disclosure, a technique for handling service flows in a wireless communication system includes receiving, at a BS, a first packet over a first service flow. In this case, the first service flow has a first QoS. A packet classifier associated with the first packet is then determined. A second service flow, between an appropriate SS and the BS, is then created with a second QoS when the packet classifier for the first packet corresponds to a selected classifier. The second service flow is deleted when, for example, detected inactivity is above a determined level (based on, for example, a dynamic service deletion (DSD) message). As another example, the second service flow may be deleted based on a snooped tear-down message.

With reference to FIG. 1, a service flow diagram 100 illustrates creation and deletion of an example dynamic service flow between a subscriber station (SS) 104 and a base station (BS) 102, according to various aspects of the present disclosure. While the diagram 100 depicts the creation of a new flow based on uplink traffic transmitted from the SS 104 to the BS 102, the techniques disclosed herein are equally applicable to the creation of new flows based on downlink traffic received at the BS 102 and destined for the SS 104. During network entry 106 (e.g., following power-up of the SS 104) the SS 104 initially communicates with the BS 102. In response to the initial communication from the SS 104, the BS 102 provides a dynamic service addition (DSA) message 108 to the SS 104 that establishes a default service flow having a default QoS, e.g., a BE QoS, for the SS 104. The SS 104 then transmits one or more packets 110 over default service flow. The SS 104 may, for example, be executing a game application that sends packets, having an associated packet classifier, to a known game port.

The packet classifier may, for example, correspond to a port number or a server IP address (or other information) that is known by the BS 102 to require a given QoS. For example, the packet classifier may correspond to a game port number that is known to the BS 102 to require an ertPS QoS. In this case, the BS 102 provides a DSA message 112 to the SS 104 to establish a new service flow that has an ertPS QoS. Packets 114 may then be transferred between the SS 104 and the BS 102 on the new service flow. The BS 102 may then monitor the new service flow for activity. When the activity on the new service flow drops below a threshold level for a given period of time, the BS 102 is configured to send a DSD message 116 to the SS 104 to notify the SS 104 that the new service flow has been deleted. The SS 104 may then communicate with BS 102 over the initial service flow until a new service flow is created in response to the SS 104 sending a packet to the BS 102 that includes a packet classifier that causes the BS 102 to create another new service flow having a packet classifier associated QoS. It should be appreciated that multiple service flows may be established and active between that SS 104 and the BS 102 at any point in time.

Figure 2:
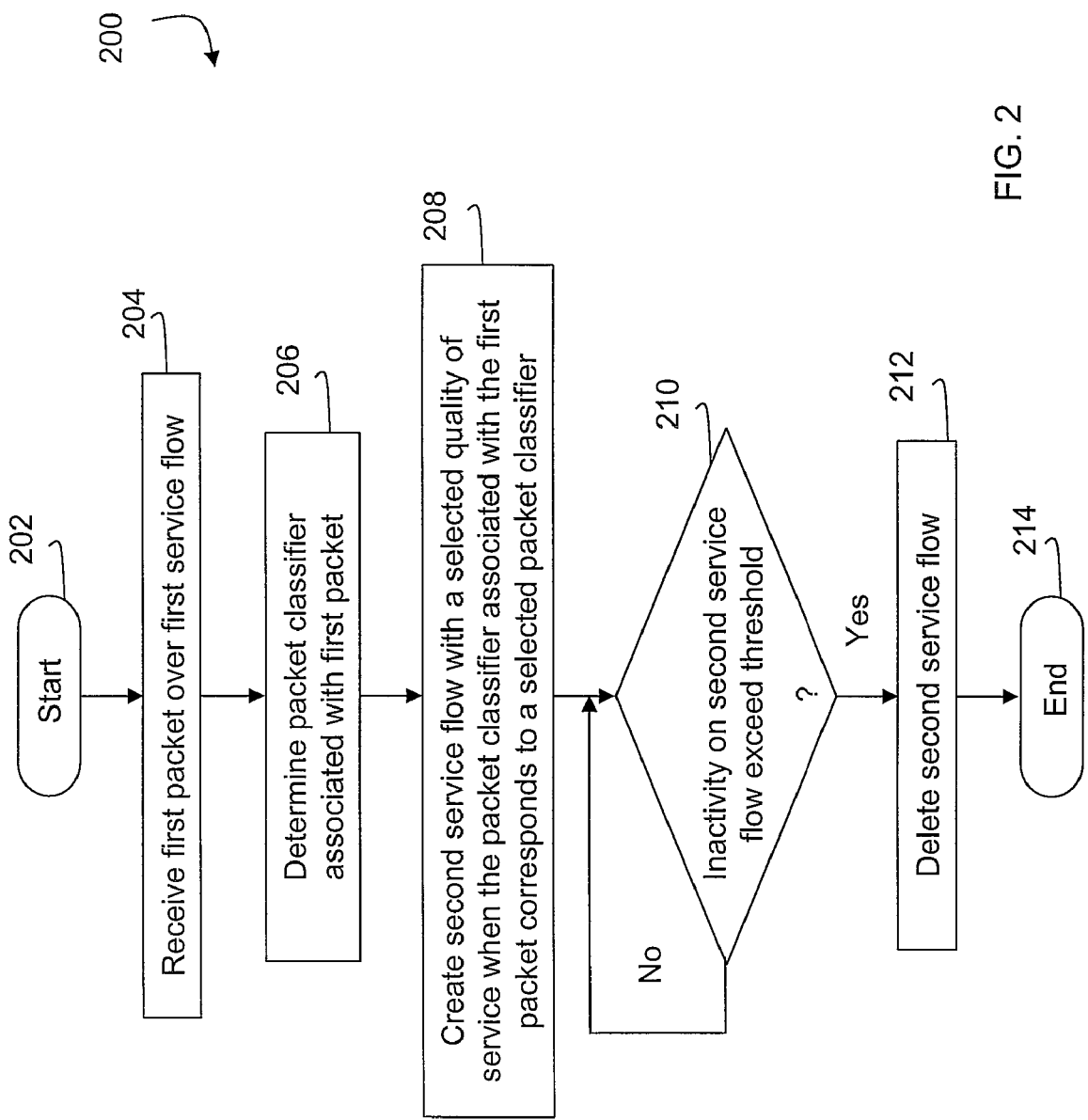
FIG. 2 is a flowchart of a process that creates (based on a packet classifier) and deletes (based on inactivity) a dynamic service flow having a selected quality of service (which is dependent on the packet classifier) according to the present disclosure.

Moving to FIG. 2, an example process 200 is illustrated that is employed at a serving base station (BS) to create a new service flow for a subscriber station (SS) in response to receiving a packet that has an appropriate packet classifier. In block 202 the process 200 is initiated, at which point control transfers to block 204. In block 204, the BS, e.g., the BS 102, receives a packet over a default service flow from an SS, e.g., the SS 104, or from another device that wishes to establish communication with the SS 104. Next, in block 206, the BS 102 determines what packet classifier is associated with the received packet or packets. Assuming that the packet classifier indicates that a new service flow is warranted, in block 208, a second service flow with a selected QoS is created. Then, in decision block 210, the BS 102 determines whether inactivity on the new service flow has exceeded a threshold. If inactivity does not exceed the threshold in block 210, control loops on block 210. If inactivity exceeds the threshold in block 210, control transfers to block 212 where the new service flow is deleted. Alternatively, the new service flow may be deleted based on other criteria, e.g., a snooped teardown message. It should be appreciated that multiple processes that correspond to the process 200 may operate in parallel. As noted above, the SS 104 may be notified of the deletion of the new service flow when the BS 102 sends a DSD message to the SS 104. Following block 212, the process 200 terminates in block 214 and control returns to a calling process.

Figure 3:
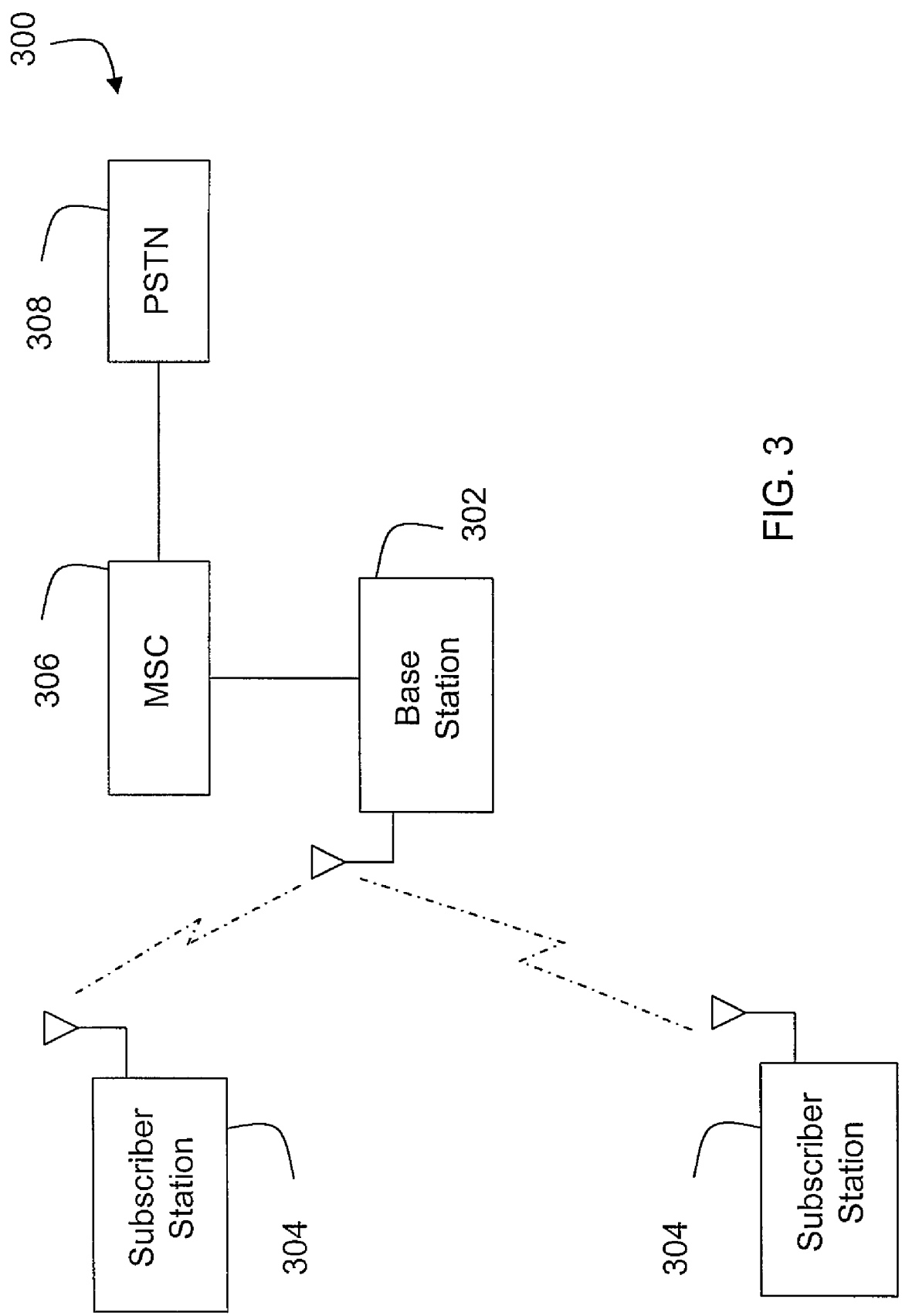
FIG. 3 is an electrical block diagram of an example wireless communication system that may create and delete dynamic service flows according to the present disclosure.

With reference to FIG. 3, an example wireless communication system 300 includes multiple subscriber stations (SSs) 304, e.g., mobile stations (MSs), that are configured to communicate with another device, via a serving base station (BS) 302. In various embodiments, the system 300 is configured to establish a new service flow based on a packet classifier associated with a packet received at the BS 302. The SSs 304 may transmit/receive various information, e.g., voice, images, video, and audio, to/from various sources, e.g., another SS, or an Internet connected server. As is depicted, the BS 302 is coupled to a mobile switching center (MSC) 306, which is coupled to a public switched telephone network (PSTN) 308. Alternatively, the network 300 may not employ the MSC 306 when voice service is based on voice over Internet protocol (VoIP) technology, where calls to the PSTN 308 are typically routed through a gateway (not shown).

The BS 302 includes a transmitter and a receiver (not individually shown), both of which are coupled to a control unit (not shown), which may be, for example, a microprocessor, a microcontroller, a programmable logic device (PLD), or an application specific integrated circuit (ASIC) that is configured to execute a software system to perform at least some of the various techniques disclosed herein. Similarly, the SSs 304 include a transmitter and a receiver (not individually shown) coupled to a control unit (not shown), which may be, for example, a microprocessor, a microcontroller, a PLD, or an ASIC that is configured to execute a software system to perform at least some of the various techniques disclosed herein. The control unit may also be coupled to a display (e.g., a liquid crystal display (LCD)) and an input device (e.g., a keypad).

Accordingly, techniques have been disclosed herein that facilitate creation of a new service flow (having a desired quality of service) in response to receiving a packet having a packet classifier that is associated with the desired quality of service. As noted above, the packet may be received from a subscriber station or be destined for a subscriber station.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment is typically stored in one or more machine readable storage mediums, such as fixed (hard) drives, diskettes, optical disks, magnetic tape, semiconductor memories (e.g., read-only memories (ROMs), programmable ROMs (PROMs), etc.), thereby making an article of manufacture in accordance with the invention. The article of manufacture containing the computer programming code is used by either executing the code directly from the storage device, by copying the code from the storage device into another storage device, such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of handling service flows in a wireless communication system, comprising:
   receiving at a base station a first packet over a first service flow, the first service flow having a first quality of service, wherein the first packet is transmitted from a subscriber station or destined for the subscriber station;
   determining a packet classifier associated with the first packet;
   creating a second service flow with a selected quality of service different from the first quality of service when the packet classifier for the first packet indicates that the selected quality of service is desired for transmission of packets subsequent to the first packet; and
   sending, from the base station, a dynamic service addition message to the subscriber station to inform the subscriber station of the second service flow.

2. The method of claim 1, further comprising:
   receiving, at the base station, subsequent packets over the second service flow with the selected quality of service.

3. The method of claim 1, wherein the first quality of service is best effort.

4. The method of claim 1, wherein the selected quality of service is enhanced real-time polling service.

5. The method of claim 1, wherein the packet classifier is based on a port number.

6. The method of claim 1, wherein the packet classifier is based on a server internet protocol address.

7. The method of claim 1, further comprising:
   detecting inactivity on the second service flow; and
   deleting the second service flow when the detected inactivity is above a determined level.

8. A base station, comprising:
   a receiver configured to receive at the base station a first packet over a first service flow, the first service flow having a first quality of service, wherein the first packet is transmitted from a subscriber station or destined for the subscriber station;
   a processor coupled to the receiver, wherein the processor is configured to:
      determine a packet classifier associated with the first packet; and
      create a second service flow with a selected quality of service different from the first quality of service when the packet classifier for the first packet indicates that the selected quality of service is desired for transmission of packets subsequent to the first packet; and
   a transmitter coupled to the processor, wherein the processor is configured to transmit, using the transmitter, a dynamic service addition message to a subscriber station to inform the subscriber station of the second service flow.

9. The base station of claim 8, wherein the base station is further configured to receive subsequent packets transmitted over the second service flow with the selected quality of service.

10. The base station of claim 8, wherein the first quality of service is best effort.

11. The base station of claim 8, wherein the selected quality of service is enhanced real-time polling service.

12. The base station of claim 8, wherein the packet classifier is based on a port number associated with the first packet.

13. The base station of claim 8, wherein the packet classifier is based on a server internet protocol address.

14. The base station of claim 8, wherein the processor is further configured to:
- detect inactivity on the second service flow; and
- delete the second service flow when the detected inactivity is above a determined level.

15. A method of handling service flows in a wireless communication system, comprising:
- receiving, at a base station, a first packet over a first service flow, the first service flow having a first quality of service;
- determining a packet classifier associated with the first packet;
- creating, between a subscriber station and the base station, a second service flow with a second quality of service different from the first quality of service when the packet classifier for the first packet indicates that the selected quality of service is desired for transmission of packets subsequent to the first packet;
- sending, from the base station, a dynamic service addition message to the subscriber station to inform the subscriber station of the second service flow;
- detecting inactivity on the second service flow; and
- deleting the second service flow when the detected inactivity is above a determined level.

16. The method of claim 15 wherein before detecting inactivity on the second service flow, the method further comprises:
- receiving, at the base station, subsequent packets over the second service flow with the second quality of service, wherein the second quality of service is at a higher performance level than the first quality of service.

* * * * *